Patented Oct. 9, 1951

2,570,760

UNITED STATES PATENT OFFICE 2,570,760

PREPARATION OF N-CYANOMETHYL-MORPHOLINE

Walter M. Bruner and Frederick K. Watson, Wilmington, Del., assignors to E. I. du Pont de Nemours & Company, Wilmington, Del., a corporation of Delaware No Drawing. Application May 18, 1949, Serial No. 94,044

1 Claim. (Cl. 260—247.5)

This invention relates to certain novel heterocyclic nitrogen compounds, namely N-cyanomethyl morpholine and beta-N-aminoethyl morpholine.

An object of this invention is to prepare novel heterocyclic nitrogen compounds which are of value in the manufacture of agents which improve the dyeability of nylon yarns. Another object of the invention is to provide a process for the preparation of N-cyanomethyl morpholine and beta-N-aminoethyl morpholine. Other objects of the invention will appear hereinafter.

It has been discovered in accordance with this invention that N-cyanomethyl morpholine can be prepared by reacting formaldehyde cyanhydrin with morpholine. In a preferred embodiment the reaction between formaldehyde cyanhydrin and morpholine takes place in the presence of water as a diluent and in the absence of any added catalyst at a temperature preferably within the range of 20° to 60° C. in the initial stages and at a temperature within the range of 75° to 100° C. in the final stages of the reaction. It is highly important that the temperature be maintained below 65° C. during the initial stages, i. e. during the time when the morpholine reactant and the formaldehyde cyanhydrin reactant are brought into contact with each other. It is also important that the reaction mixture finally be brought to a temperature within the range of 75° to 100° C. so that maximum yield of the desired N-cyanomethyl morpholine may be obtained. Any suitable method may be employed for separating the N-cyanomethyl morpholine from the resulting reaction product. In general, N-cyanomethyl morpholine precipitates from the reaction mixture quite readily upon cooling or evaporation of water therefrom. In a preferred embodiment water is evaporated from the reaction mixture at diminished pressure while maintaining the temperature at about 50° to 80° C. This produces a crude residue which upon recrystallization from any suitable solvent such as ethanol yields a purified product having a melting point of about 61° to 63° C. This reaction product can be distilled if desired, the boiling point being about 78° C. at 2 mm.

The N-cyanomethyl morpholine obtained in the practice of this invention yields upon hydrogenation beta-N-aminoethyl morpholine. Any suitable hydrogenation catalyst may be employed in carrying out this hydrogenation of N-cyanomethyl morpholine, suitable catalysts being metallic cobalt, nickel, copper chromite, etc. The hydrogenation takes place at a convenient rate if the temperature is maintained within the range of about 75° C. to 200° C., under superatmospheric pressure. An excess of ammonia may be employed to suppress the formation of by-products.

The invention is illustrated further by means of the following example.

*Example.*—A 50% aqueous solution of formaldehyde cyanhydrin is added slowly to an equimolar quantity of morpholine over a one-half to one-hour period while maintaining the reaction mixture at a temperature within the range of 20° to 65° C. When the addition of formaldehyde cyanhydrin is complete, the temperature is raised to 80° C. and the reaction mixture is kept at this temperature for a period of thirty minutes. Water is evaporated from the reaction mixture at 70° C. under diminished pressure. The resulting solid product is distilled under diminished pressure (boiling point 78° C./2 mm.). The pure product melts at 61° to 63° C. The yield is of the order of magnitude of about 75% to 80%. Hydrogenation of the resulting product in the presence of a reduced cobalt oxide catalyst and in the presence of an excess of ammonia as a diluent at a temperature of 110° C. under a pressure of 800 atmospheres gives a product which upon distillation at about 1 mm. pressure is found to boil at a temperature within the range of 50° to 60° C. This product is beta-N-aminoethyl morpholine.

We claim:

A process for preparing N-cyanomethyl morpholine which comprises adding formaldehyde cyanhydrin to morpholine in the presence of water as a diluent in the absence of any added catalyst at a temperature within the range of 20° to 65° C. and thereafter heating the resulting mixture at a temperature within the range of 75° to 100° C. until the reaction between the formaldehyde cyanhydrin and the morpholine is complete, and separating N-cyanomethyl morpholine from the resulting product.

WALTER M. BRUNER.
FREDERICK K. WATSON.

REFERENCES CITED

The following references are of record in the file of this patent:

UNITED STATES PATENTS

| Number | Name | Date |
|---|---|---|
| 2,326,721 | Bruson | Aug. 10, 1943 |
| 2,375,628 | D'Alelio et al. | May 8, 1945 |
| 2,425,693 | Cook et al. | Aug. 12, 1947 |
| 2,439,359 | Dixon et al. | Apr. 6, 1948 |